(12) United States Patent
Li et al.

(10) Patent No.: US 10,275,653 B2
(45) Date of Patent: Apr. 30, 2019

(54) PRIMARY VIDEO OBJECTS WITH NEIGHBORHOOD REVERSIBILITY

(71) Applicant: BEIHANG UNIVERSITY, Beijing (CN)

(72) Inventors: Jia Li, Beijing (CN); Xiaowu Chen, Beijing (CN); Bin Zhou, Beijing (CN); Qinping Zhao, Beijing (CN); Changqun Xia, Beijing (CN); Anlin Zheng, Beijing (CN); Yu Zhang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 15/719,480

(22) Filed: Sep. 28, 2017

(65) Prior Publication Data

US 2018/0247126 A1 Aug. 30, 2018

(30) Foreign Application Priority Data

Feb. 24, 2017 (CN) .......................... 2017 1 0104243

(51) Int. Cl.
  *G06K 9/00* (2006.01)
  *G06K 9/46* (2006.01)
  *G06K 9/62* (2006.01)

(52) U.S. Cl.
  CPC ..... *G06K 9/00718* (2013.01); *G06K 9/00744* (2013.01); *G06K 9/00765* (2013.01);
  (Continued)

(58) Field of Classification Search
  CPC ............. G06K 9/00718; G06K 9/6267; G06K 9/4638; G06K 9/00765; G06K 9/6265;
  (Continued)

(56) References Cited

U.S. PATENT DOCUMENTS

2017/0287134 A1* 10/2017 Abedini ................. G06K 9/622
2018/0032846 A1* 2/2018 Yang ................... G06K 9/00711
(Continued)

OTHER PUBLICATIONS

He et al, "SuperCNN: A Superpixelwise Convolutional Neural Network for Salient Object Detection", city unniversity of Hong Kong, Kowloon Tong, Hong Kong, Springer, Published online: Apr. 8, 2015 (Year: 2015).*

(Continued)

*Primary Examiner* — Amara Abdi
(74) *Attorney, Agent, or Firm* — J.C. Patents (57) ABSTRACT

Provided is a method and a system for detecting and segmenting primary video objects with neighborhood reversibility, including: dividing each video frame of a video into super pixel blocks; representing each super pixel block with visual features; constructing and training a deep neural network to predict the initial foreground value for each super pixel block in the spatial domain; constructing a neighborhood reversible matrix and transmitting the initial foreground value, constructing an iterative optimization problem and resolving the final foreground value in the temporal spatial domain; performing pixel level transformation on the final foreground value; optimizing the final foreground value for the pixel using morphological smoothing operations; determining whether the pixel belongs to the primary video objects according to the final foreground value. The present disclosure does not require to set a priori assumption for processing a video, and is especially suitable for big data sets including complicated scenarios.

10 Claims, 3 Drawing Sheets

(52) U.S. Cl.
CPC ......... *G06K 9/4638* (2013.01); *G06K 9/4642* (2013.01); *G06K 9/6207* (2013.01); *G06K 9/6215* (2013.01); *G06K 9/6259* (2013.01); *G06K 9/6265* (2013.01); *G06K 9/6267* (2013.01)

(58) Field of Classification Search
CPC ............... G06K 9/6215; G06K 9/6207; G06K 9/00744; G06K 9/4642; G06K 9/6259
See application file for complete search history.

(56) References Cited

U.S. PATENT DOCUMENTS

2018/0101743 A1\* 4/2018 Yang .................... G06K 9/4628
2018/0150684 A1\* 5/2018 Wang ....................... G06T 7/11

OTHER PUBLICATIONS

Anestis Papzoglou et al., "Fast object segmentation in unconstrained video" Proceeding; ICCV '13 Proceedings of the 2013 IEEE International Conference on Computer Vision; Dec. 1-8, 2013; pp. 1777-1784.

Dong Zhang et al., "Video Object Segmentation through Spatially Accurate and Temporally Dense Extraction of Primary Object Regions" Proceeding; CVPR '13 Proceedings of the 2013 IEEE Conference on Computer Vision and Pattern Recognition; Jun. 23-28, 2013; pp. 628-635.

Shuai Zheng et al., "Conditional Random Fields as Recurrent Neural Networks" Proceeding; ICCV '15 Proceedings of the 2015 IEEE International Conference on Computer Vision (ICCV); Dec. 7-13, 2015; pp. 1529-1537.

\* cited by examiner

PRIMARY VIDEO OBJECTS WITH NEIGHBORHOOD REVERSIBILITY

CROSS-REFERENCE TO RELATED APPLICATION

This application claims priority to Chinese Patent Application No. 201710104243.3, filed on Feb. 24, 2017, which is hereby incorporated by reference in its entirety.

TECHNICAL FIELD

The present disclosure relates to the field of computer vision and image video processing, and more particularly to a method and a system for detecting and segmenting primary video objects with neighborhood reversibility.

BACKGROUND

In recent years, with the combination and application of random forest, multiple instance learning, stacked auto-encoders, deep neural network and other technologies, in the aspect of image foreground objects segmentation which is also referred to as image-based salient object detection, there have been many powerful detection models trained on large-scale image datasets. As a result, impressive development as well as progress has been made.

Primary video objects are intrinsically related to the image salient object, that is, the foreground object sequence in a video is a video salient object in most video frames. However, the two also have a fundamental difference, manifested in: firstly, the foreground object sequence in all video frames in the video is not always a image salient object; secondly, the consistent relation between the video frames in the video provides an additional clue for segmenting foreground object sequence from the background; lastly, due to the various actions of a camera and the object, the foreground object sequence may fall at the boundary of the video, resulting in the invalidation of background prior which is widely used in the image salient detection model.

Segmentation of the primary video objects is a very important step in many computer vision applications. However, there are still huge challenges against the segmentation of the primary video objects. Due to a lack of large-scale training video datasets, it hard to use machine learning methods to train time-space domain detection models whose performances are powerful enough. In addition, due to a movement of a camera and a subject, one video foreground object sequence generates different manners of appearance in different video frames, or multiple foreground object sequences appears simultaneously, or an occlusion phenomenon is occurred with an interference background, thus making it difficult to highlight the foreground object sequence throughout the whole video consistently.

In order to solve the problem of the segmentation of the primary video objects, there are three types of models in the current research: a full-automatic segmentation model, an interactive segmentation model and a semantic information guidance segmentation model.

The interactive segmentation model requires manual labeling of the foreground object sequence for the first video frame or several key video frames, followed by an automatic segmentation process. Whereas the semantic information guidance segmentation model requires to set a semantic category of the primary video objects before the segmentation process, so this model can segment the primary video objects in conjunction with the object detector or other tools.

In general, these two models can both achieve good performance relying on priori knowledge obtained by manual annotation or data learning. However, the required interaction and semantic labeling make it difficult for them to be promoted and applied in large-scale data sets.

The full-automatic segmentation model is intended to directly segment the foreground object sequence for a single video or to separate a foreground object sequence from a video set. In general, the full-automatic segmentation model requires a definitive assumption for a spatial visual attribute or a manner of time domain motion of the primary video objects. For example, Papazoglou et al. proposed at the ICCV conference in 2013 that the foreground object in the most video segments should as possible have an assumption different from the surrounding background. They first got the foreground probability graph based on a motion information initialization, and then optimized the resolution in the time-space domain to improve the smoothness of the foreground object motion. For another example, Zhang et al. proposed at the CVPR conference in 2013 the segmentation of the primary video objects on the basis of a system framework of hierarchical directed acyclic graphs, with the assumption that the objects are compact in the spatial domain and their shapes and positions change with the time domain smoothly. In fact, similar assumptions occur in many full-automatic segmentation models and good performance is achieved in several small data (data sets such as SegTrack and SegTrackV2). However, for the big data sets such as Youtube-Objects and VOS that include complicated scenarios, the assumption may not hold true, and such models sometimes produce negative cases. Moreover, many full-automatic segmentation models require to calculate an optical flow to the video, or to iterate to solve the complex optimization problem, which renders the computation overhead significantly increased in the process of segmenting the primary video objects by this model and results in a lower segmentation speed.

SUMMARY

The present disclosure provides a method and system for detecting and segmenting primary video objects with neighborhood reversibility, to solve the problem that the existing method for primary video objects segmentation cannot be applied to the large-scale video data sets.

The present disclosure provides a method for detecting and segmenting primary video objects with neighborhood reversibility, including:

dividing a pending video to be processed into a plurality of video frames $\{I_1, I_2, \ldots, I_{u-1}, I_u\}$ and dividing each video frame $I_u$ into a plurality of super pixel blocks $\{O_{u1}, O_{u2}, \ldots, O_{ui}, \ldots, O_{uN_u}\}$ according to a currently set scale, where u is a number of the plurality of video frames, and $N_u$ is a number of super pixel blocks in the video frame $I_u$;

obtaining a set of visual attention attribute features for each super pixel block, where each visual attention attribute feature in the set of visual attention attribute features is an average value for the visual attention attribute feature of all the pixels in the super pixel block;

for each video frame $I_u$, with each video frame $I_v$ of T frames both prior to and after the video frame $I_u$ and the $I_u$ itself taken as the currently pending video frames, performing step 1 to step 3 to obtain the 2 T neighborhood reversible matrices corresponding to the video frame $I_u$; where $I_v = \{O_{v1}, O_{v2}, \ldots, O_{vj}, \ldots, O_{vN_v}\}$, $I_v \in T_u$, $T_u = \{I_{u-T}, \ldots, I_{u-1}, I_{u+1}, \ldots, I_{u+T}\}$, T is a positive integer and $N_v$ is a number of super pixel blocks in the video frame $I_v$;

Step 1: constructing a corresponding neighborhood reversible matrix $F_{uv}$ according to super pixel block corresponding to currently pending video frames;

$$\begin{bmatrix} f_{u1,v1} & \cdots & \cdots & f_{u1,vj} & \cdots & \cdots & f_{u1,vN_v} \\ \cdots & \cdots & \cdots & \cdots & \cdots & \cdots & \cdots \\ \cdots & \cdots & \cdots & \cdots & \cdots & \cdots & \cdots \\ f_{ui,v1} & \cdots & \cdots & f_{ui,vj} & \cdots & \cdots & f_{ui,vN_v} \\ \cdots & \cdots & \cdots & \cdots & \cdots & \cdots & \cdots \\ \cdots & \cdots & \cdots & \cdots & \cdots & \cdots & \cdots \\ f_{uN_u,v1} & \cdots & \cdots & f_{uN_u,vj} & \cdots & \cdots & f_{uN_u,vN_v} \end{bmatrix}$$

step 2: for each super pixel block corresponding to each video frame in the currently pending video frame, sorting all the super pixel blocks in another video frame by the similarities to the set of visual attention attribute features of the super pixel blocks; if the super pixel block $O_{ui}$ in the video frame $I_u$ and the super pixel block $O_{vj}$ in the video frame $I_v$ are the super pixel blocks that are most similar to the first K super pixel blocks of each other, then determining that the super pixel blocks $O_{ui}$ and $O_{vj}$ are mutually reversible K neighborhoods to each other, where K is a positive integer;

step 3: as to each element $f_{ui,vj}$ in the matrix $F_{uv}$, if $K \leq K_0$, then assigning $f_{ui,vj} = \exp(-2K/K_0)$ to the element $f_{ui,vj}$, otherwise assigning 0 to them, where $K_0$ is a preset positive integer;

constructing a deep neural network and predicting an initial foreground value for each super pixel block in each video frame $I_u$ in spatial domain based on the foreground regressor trained and obtained by the deep neural network using a large-scale data set in the field of the image salience;

for each video frame $I_u$, repeatedly performing step A to step B for N times according to the 2 T neighborhood reversible matrices corresponding to the video frame $I_u$ to obtain a final foreground value for each super pixel block in the video frame $I_u$ in time-space domain, where the final foreground value is the current foreground value for each super pixel block after the last execution of step B, and N is a preset positive integer;

step A: transmitting the current foreground value for each super pixel block in the video frame $I_u$ sequentially to the video frame $I_v$ of T frames both prior to and after the video frame $I_u$, respectively to obtain 2 T foreground transmitting values for each super pixel block in the video frame $I_u$, where the first formula is:

$$x_{u|v}^{t-1} = \frac{F_{uv} x_v^{t-1}}{K_0};$$

where $x_v^{t-1}$ represents a column vector of a foreground value for each super pixel block in the video frame $I_v$ before the $t^{th}$ iteration; and $x_{u|v}^{t-1}$ represents a column vector of a foreground transmitting value transmitted to the video frame $I_v$ before the $t^{th}$ iteration of each super pixel block in the video frame $I_u$;

step B: constructing the optimization problem and solving the optimization problem according to the foreground value and the 2 T foreground transmitting values of each super pixel block in the video frame $I_u$, and obtaining and updating the current foreground value for each super pixel block according to the optimized foreground value of each super pixel block;

for each pixel in each video frame $I_u$, taking the final foreground value for the super pixel block in which the pixel is located as the foreground value for the pixel in the current scale;

optimizing the foreground value for each pixel in each video frame $I_u$ using morphological smoothing operation; for the foreground value for each pixel in each video frame $I_u$, if the foreground value for the pixel is larger than a preset threshold, then determining that the pixel belongs to the primary video objects; otherwise, determining that the pixel belongs to the video background object sequence.

The present disclosure also provides a system for detecting and segmenting primary video objects with neighborhood reversibility, including:

a dividing module, configured to divide the pending video to be processed into a plurality of video frames $\{I_1, I_2, \ldots, I_{u-1}, I_u\}$ and divide each video frame $I_u$ into a plurality of super pixel blocks $\{O_{u1}, O_{u2}, \ldots, O_{ui}, \ldots, O_{uN_u}\}$ according to a currently set scale, where u is a number of the plurality of video frames, and $N_u$ is a number of super pixel blocks in the video frame $I_u$;

a featuring module, configured to obtain a set of visual attention attribute features for each super pixel block, where each visual attention attribute feature in the set of visual attention attribute features is an average value for the visual attention attribute feature of all the pixels in the super pixel block;

a matrix module, configured to, for each video frame $I_u$, with each video frame $I_v$ of T frames both prior to and after the video frame $I_u$ and the $I_u$ itself taken as the currently pending video frames, perform step 1 to step 3 to obtain the 2 T neighborhood reversible matrices corresponding to the video frame $I_u$; where $I_v = \{O_{v1}, O_{v2}, \ldots, O_{vj}, \ldots, O_{vN_v}\}$, $I_v \in T_u$, $T_u = \{I_{u-T}, \ldots, I_{u-1}, I_{u+1}, \ldots, I_{u+T}\}$, T is a positive integer and $N_v$ is a number of super pixel blocks in the video frame $I_v$;

step 1: constructing a corresponding neighborhood reversible matrix $F_{uv}$ according to super pixel blocks corresponding to currently pending video frames;

$$\begin{bmatrix} f_{u1,v1} & \cdots & \cdots & f_{u1,vj} & \cdots & \cdots & f_{u1,vN_v} \\ \cdots & \cdots & \cdots & \cdots & \cdots & \cdots & \cdots \\ \cdots & \cdots & \cdots & \cdots & \cdots & \cdots & \cdots \\ f_{ui,v1} & \cdots & \cdots & f_{ui,vj} & \cdots & \cdots & f_{ui,vN_v} \\ \cdots & \cdots & \cdots & \cdots & \cdots & \cdots & \cdots \\ \cdots & \cdots & \cdots & \cdots & \cdots & \cdots & \cdots \\ f_{uN_u,v1} & \cdots & \cdots & f_{uN_u,vj} & \cdots & \cdots & f_{uN_u,vN_v} \end{bmatrix}$$

step 2: for each super pixel block corresponding to each video frame in the currently pending video frame, sorting all the super pixel blocks in another video frame by the similarities to the set of visual attention attribute features of the super pixel blocks; if the super pixel block $O_{ui}$ in the video frame $I_u$, and the super pixel block $O_{vj}$ in the video frame $I_v$ are the super pixel blocks that are most similar to the first K super pixel blocks of each other, then determining that the super pixel blocks $O_{ui}$ and $O_{vj}$ are mutually reversible K neighborhood to each other, where K is a positive integer;

step 3: for each element $f_{ui,vj}$ in the matrix $F_{uv}$, if $K \leq K_0$ then assigning $f_{ui,vj} = \exp(-2K/K_0)$ to the element $f_{ui,vj}$, otherwise assigning 0, where $K_0$ is a preset positive integer;

a predicting module, configured to construct a deep neural network and predicting an initial foreground value for each super pixel block in each video frame $I_u$, in spatial domain based on the foreground regressor trained and obtained by the deep neural network using a large-scale data set in the field of the image salience;

a computing module, configured to, for each video frame $I_u$, repeatedly perform step A to step B for N times according to the 2 T neighborhood reversible matrices corresponding to the video frame $I_u$, to obtain a final foreground value for each super pixel block in the video frame $I_u$ in the time-space domain, where the final foreground value is the current foreground value for each super pixel block after the last execution of step B, and N is a preset positive integer;

step A: transmitting the current foreground value for each super pixel block in the video frame $I_u$ sequentially to the video frame $I_v$ of T frames both prior to and after the video frame $I_u$, respectively, to obtain 2 T foreground transmitting values for each super pixel block in the video frame $I_u$, where the first formula is:

$$x_{u|v}^{t-1} = \frac{F_{uv} \cdot x_v^{t-1}}{K_0}$$

Where $x_v^{t-1}$ represents a column vector of a foreground value for each super pixel block in the video frame $I_v$ before the $t^{th}$ iteration; and $x_{u|v}^{t-1}$ represents a column vector of a foreground transmitting value transmitted to the video frame $I_v$ before the $t^{th}$ iteration of each super pixel block in the video frame $I_u$;

step B: constructing the optimization problem and solving the optimization problem according to the foreground value and the 2 T foreground transmitting values of each super pixel block in the video frame $I_u$, and obtaining and updating the current foreground value for each super pixel block according to the optimized foreground value of each super pixel block;

a transforming module, configured to, for each pixel in each video frame $I_u$, take the final foreground value for the super pixel block in which the pixel is located as the foreground value for the pixel in the current scale;

a determining module, configured to optimize the foreground value for each pixel in each video frame $I_u$ using morphological smoothing operation; for the foreground value for each pixel in each video frame $I_u$, if the foreground value for the pixel is larger than a preset threshold, then determine that the pixel belongs to the primary video objects; otherwise, determine that the pixel belongs to the video background object sequence.

The present disclosure provides a method and a system for detecting and segmenting primary video objects with neighborhood reversibility, where a deep neural network model is constructed to predict the initial foreground value for each super pixel block, and a neighborhood reversible matrix corresponding to each video frame is constructed with a super pixel block being a unit and in conjunction with the visual attention attribute feature; based on the neighborhood reversible matrix, the foreground value for each super pixel block is transmitted to the video frame in a certain range prior to and after the video frame, and the final foreground value for each super pixel block in the time-space domain is obtained by constructing the optimization problem thus the foreground value for the pixels in each super pixel block is obtained, and the primary video objects are automatically segmented based on the foreground value for each pixel. The above solution does not need to set an assumption, such as the motion pattern or the overall change rule of the appearance of the foreground object sequence, for any videos without semantic labels, and the solution is more accurate and effective especially suitable for large-scale video data sets.

DESCRIPTION OF EMBODIMENTS

The technical solution of the embodiments of the present disclosure will now be described clearly and completely in conjunction with the accompanying drawings in the embodiments of the present disclosure, and it will be apparent that the described embodiments are merely part of the present disclosure and are not intended to be exhaustive. All other embodiments obtained by those of ordinary skill in the art without resorting to inventive labor based on embodiments in the present disclosure are within the scope of the present disclosure.

Figure 1:
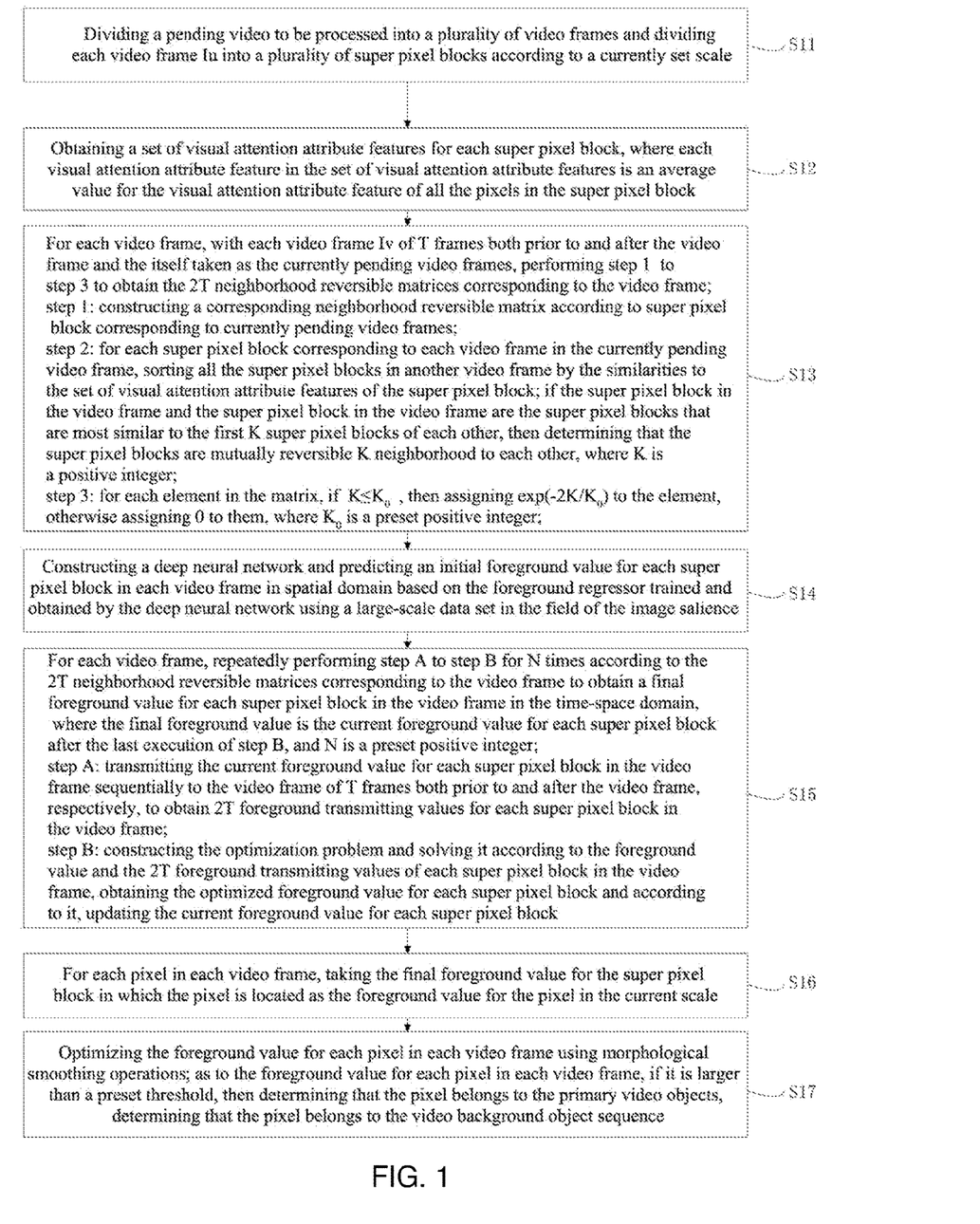
FIG. 1 is a flow diagram of a method for detecting and segmenting primary video objects with neighborhood reversibility according to an embodiment of the present disclosure.

FIG. 1 is a flow diagram of a method for detecting and segmenting primary video objects with neighborhood reversibility according to an embodiment of the present disclosure. As shown in FIG. 1, the method includes the steps of:

S11, dividing a pending video to be processed into a plurality of video frames $\{I_1, I_2, \ldots, I_{u-1}, I_u\}$ and dividing each video frame $I_u$ into a plurality of super pixel blocks $\{O_{u1}, O_{u2}, \ldots, O_{ui}, \ldots, O_{uN_u}\}$ according to a currently set scale, where u is a number of the plurality of video frames, and $N_u$ is a number of super pixel blocks in the video frame $I_u$;

S12, obtaining a set of visual attention attribute features for each super pixel block, where each visual attention attribute feature in the set of visual attention attribute features is an average value for the visual attention attribute feature of all the pixels in the super pixel block;

When observing a video, a human maintains his visual attention from the first video frame to the last video frame. In this process, the primary video objects capture the most visual attention. Visual attention is influenced by visual stimulus attributes such as color, salience, position, and semantics. Thus, the set of visual attention attribute features described above may include color features, salient features, location features, and semantic features.

Further, the number of the above color features may be determined according to the accuracy required (for example, nine), and the color features of each super pixel block is correspondingly obtained, including: transforming the video frames where the super pixel block is located to the three color spaces, i.e., RGB, Lab and HSV to obtain the color features in the 9 channels of all the pixels in the video frame where the super pixel block is located; and normalizing the color features of each pixel in each channel to [0,1]; and calculating respectively the average value for the color features of all the pixels in the 9 channels in the super pixel block to obtain the color feature of the super pixel block.

Further, the number of the above salient features may be determined according to the accuracy required (for example, nine), and the salient features of each super pixel block is correspondingly obtained, including: using raster scan technique to calculate the minimum obstacle distance from each pixel to the boundary pixel in the video frame where the super pixel block is located to obtain 9 salient features of all the pixels in the video frame where the super pixel block is located; normalizing each salient feature of each pixel to [0,1]; and calculating respectively the average value for each salient feature of all the pixels in the super pixel block to obtain the salient feature of the super pixel block.

Further, the number of the above location features may be determined according to the accuracy required (for example, two), and the location features of each super pixel block is correspondingly obtained, including: extracting two location features of a horizontal direction and a vertical direction for each pixel in a video frame where the super pixel block is located; normalizing each location feature of each pixel to [0,1]; and calculating respectively the average value for each location feature of all the pixels in the super pixel block to obtain the location feature of the super pixel block.

Further, the number of the above semantic features may be determined according to the accuracy required (for example, twenty-one), and the semantic features of each super pixel block is correspondingly obtained, including: using the CRF-RNN model to extract the 21 semantic probability graphs of the video frame where super pixel block is located to obtain 21 semantic features of all the pixels in the video frame where the super pixel block is located; normalizing each semantic feature of each pixel to [0,1]; where 21 semantic probability graphs include the predefined 20 semantic probability graphs, and 1 background semantic probability graph; and calculating respectively the average value for each semantic feature of all the pixels in the super pixel block to obtain the semantic feature of the super pixel block. The above CRF-RNN model can employ the CRF-RNN model published by Zheng et al. on ICCV in 2015.

S13, for each video frame $I_u$, with each video frame $I_v$ of T frames both prior to and after the video frame $I_u$ and the $I_u$ itself taken as the currently pending video frames, performing step 1 to step 3 to obtain the 2 T neighborhood reversible matrices corresponding to the video frame $I_u$;

where $I_v = \{O_{v1}, O_{v2}, \ldots, O_{vj}, \ldots, O_{vN_v}\}$, $I_v \in T_u$, $T_u = \{I_{u-T}, \ldots, I_{u-1}, I_{u+1}, \ldots, I_{u+T}\}$, T is a positive integer with a value of, for example 2, and $N_v$ is a number of super pixel blocks in the video frame $I_v$;

Step 1: constructing a corresponding neighborhood reversible matrix $F_{uv}$ according to super pixel block corresponding to currently pending video frames:

$$\begin{bmatrix} f_{u1,v1} & \cdots & \cdots & f_{u1,vj} & \cdots & \cdots & f_{u1,vN_v} \\ \cdots & \cdots & \cdots & \cdots & \cdots & \cdots & \cdots \\ \cdots & \cdots & \cdots & \cdots & \cdots & \cdots & \cdots \\ f_{ui,v1} & \cdots & \cdots & f_{ui,vj} & \cdots & \cdots & f_{ui,vN_v} \\ \cdots & \cdots & \cdots & \cdots & \cdots & \cdots & \cdots \\ \cdots & \cdots & \cdots & \cdots & \cdots & \cdots & \cdots \\ f_{uN_u,v1} & \cdots & \cdots & f_{uN_u,vj} & \cdots & \cdots & f_{uN_u,vN_v} \end{bmatrix}$$

Step 2: for each super pixel block corresponding to each video frame in the currently pending video frame, sorting all the super pixel blocks in another video frame by the similarities to the set of visual attention attribute features of the super pixel block; if the super pixel block $O_{ui}$ in the video frame $I_u$ and the super pixel block $O_{vj}$ in the video frame $I_v$ are the super pixel blocks that are most similar to the first K super pixel blocks of each other, then determining that the super pixel blocks $O_{ui}$ and $O_{vj}$ are mutually reversible K neighborhood to each other, where K is a positive integer;

Step 3: for each element $f_{ui,vj}$ in the matrix $F_{uv}$, if $K \leq K_0$, then assigning $f_{ui,vj} = \exp(-2K/K_0)$ to the element $f_{ui,vj}$, otherwise assigning 0 to them, where $K_0$ is a preset positive integer with a value of, for example, 10;

Further, the above for each super pixel block corresponding to each video frame in the currently pending video frame to be processed, sorting all the super pixel blocks in another video frame by the similarities to the set of visual attention attribute features of the super pixel blocks, may include: for each super pixel block corresponding to each video frame in the currently pending video frame, calculating a Manhattan distance between the sets of visual attention attribute features of all the super pixel blocks in another video frame and said super pixel block; according to the Manhattan distance, sorting all the super pixels blocks in another video frame by similarities and the smaller the Manhattan distance is, the higher the similarity will be.

Specifically, the calculation formula for Manhattan distance between the sets of visual attention attribute features of the two super pixel blocks is:

$$\text{Manhattan Distance} = \sum_{m=1}^{M} |G(O_{ui})_m - G(O_{vj})_m|$$

Where M is a number of visual attention attribute features of the super pixel block, $G(O_{ui})_m$ is the value of the $m^{th}$ visual attention attribute feature of the super pixel block $O_{ui}$ in the video frame $I_u$, and $G(O_{vj})_m$ is the value of the $m^{th}$ visual attention attribute feature of the super pixel block $O_{vj}$ in the video frame $I_v$. The smaller the distance from Manhattan is, the higher the similarity between the super pixel block $O_{ui}$ and the super pixel block $O_{vj}$.

S14, constructing a deep neural network and predicting an initial foreground value for each super pixel block in each video frame $I_u$ in spatial domain based on the foreground regressor trained and obtained by the deep neural network using a large-scale data set in the field of the image salience;

Due to a lack of large-scale video data sets for training the time-space domain detection model, it is very difficult to directly calculate the time-space domain foreground value for the super pixel block. And there is an intrinsic relation as well as a difference between the primary video objects and the image salient object: the intrinsic relation is that the foreground object sequence in the video is a video salient object in most video frames; while the difference lies in that, firstly, the foreground object sequence in all video frames in the video is not always a salient object; secondly, the consistent relation between the video frames in the video provides an additional clue for segmenting foreground object sequence from the background; lastly, due to the various actions of the camera and the object, the foreground object sequence may fall at the boundary of the video frame, resulting in the invalidation of background prior which is widely used in the image salient detection model. Based on the intrinsic relation as well as the difference between the primary video objects and the image salient object, a deep neural network is constructed in the present disclosure and this deep neural network trains spatial domain foreground regressor by using large-scale data set in the field of the image salience and predicts an initial foreground value for each super pixel block in each video frame.

Figure 2:
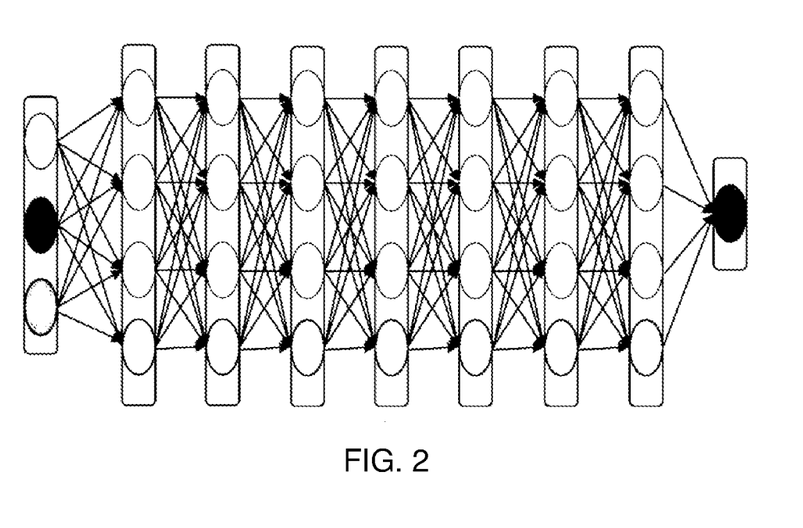
FIG. 2 is a schematic structural view of a deep neural network according to an embodiment of the present disclosure.

Further, the above deep neural network trains spatial domain foreground regressor by using large-scale data set in the field of the image salience and predicts an initial foreground value for each super pixel block in each video frame may include:

Constructing a deep neural network. FIG. 2 is a schematic structural view of a deep neural network according to an embodiment of the present disclosure. The deep neural network consists of 7 layers of full connection, where each layer of full connection of the first 6 layers of full connection includes 512 nodes while the 7th layer of full connection comprises 1 node, and full connection of each layer of the first 6 layers is immediately followed by the Batch normalization and Relu activation function, while the 7th layer of full connection uses the sigmod function as a loss function;

For example, 20615 training images are collected from the existing data sets of image salience. Firstly, each training image is divided into several super pixel blocks according to 15 scales, thus 16 million training samples of super pixel blocks are obtained, and a set of 41-dimensional visual attention attribute feature (including 9-dimensional color features, 9-dimensional salient features, 2-dimensional location features and 21-dimensional semantic features) is extracted for each super pixel block. For any training samples of the super pixel blocks, the average value for all the pixels' benchmark foreground values included in the training sample of super pixel block is calculated and the average value is normalized to [0,1] to obtain the benchmark foreground values of the training sample of the super pixel;

The deep neural network is used to supervise the offline spatial domain foreground regressor according to the set of visual attention attribute feature and the benchmark foreground value for training sample of each super pixel block. In the training process, the input is the set of visual attention attribute features of the training sample of super pixel block while the output is the benchmark foreground value for the training sample of super pixel block, where the output value is within the range of [0,1];

Given the deep neural network of the spatial foreground degree regressor that has been trained, the initial foreground value for the super pixel block in the spatial domain can be output by inputting the set of visual attention attribute feature of each super pixel block in each video frame.

S15, for each video frame $I_u$, repeatedly performing step A to step B for N times according to the 2 T neighborhood reversible matrices corresponding to the video frame $I_u$ to obtain a final foreground value for each super pixel block in the video frame $I_u$ in time-space domain, where the final foreground value is the current foreground value for each super pixel block after the last execution of step B, and N is a preset positive integer;

Step A: transmitting the current foreground value for each super pixel block in the video frame $I_u$, sequentially to the video frame $I_v$ of T frames both prior to and after the video frame $I_u$, respectively, to obtain 2 T foreground transmitting values for each super pixel block in the video frame $I_u$, where the first formula is:

$$x_{u|v}^{t-1} = \frac{F_{uv} x_v^{t-1}}{K_0}$$

Where $x_v^{t-1}$ represents a column vector of a foreground value for each super pixel block in the video frame $I_v$ before the $t^{th}$ iteration; and $x_{u|v}^{t-1}$ represents a column vector of a foreground transmitting value transmitted to the video frame $I_v$ before the $t^{th}$ iteration of each super pixel block in the video frame $I_u$;

Step B: constructing the optimization problem and solving the optimization problem it according to the foreground value and the 2 T foreground transmitting values of each super pixel block in the video frame and obtaining and updating the current foreground value for each super pixel block according to the optimized foreground value of each super pixel block;

Further, the constructing the optimization problem and solving it according to the foreground value and the 2 T foreground transmitting values of each super pixel block in the video frame obtaining the optimized foreground value for each super pixel block in the above step B may include:

Constructing a Quadratic Optimization Formula:

$$x_u^t = \underset{x}{\operatorname{argmin}} \|x - x_u^{t-1}\|_2^2 + \lambda_c \sum_{v \in T_u} \|x - x_{u|v}^{t-1}\|_2^2, \text{ s.t. } x \pm 0$$

Where $\lambda c$ is a positive real number, preferably with a value of 0.5, $x_u^{t-1}$ represents a column vector of the foreground value for each super pixel block prior to the $t^{th}$ iteration in the video frame $I_u$, $x_u^t$ represents the column vector of the foreground value for each super pixel block after the $t^{th}$ iteration in the video frame $I_u$;

Then substituting the Euclidean distance formula into the above quadratic optimization formula:

$$d_{12} = \sqrt{\sum_{k=1}^{n} (x_{1k} - x_{2k})^2}$$

And resolving and obtaining the foreground value for each super pixel block in video frame $I_u$;

$$x_u^t = \frac{x_u^{t-1} + \lambda_c \sum_{v \in T_u} x_{u|v}^{t-1}}{1 + \lambda_c}$$

Normalizing the foreground value for each super pixel block in the obtained video frame $I_u$, to [0,1] to obtain the optimized foreground value for each super pixel block.

Further, after S15, it may further include: processing the final foreground value for each super pixel block in the time-space domain of the video frame $I_u$ using Gaussian high-pass filtering. This can improve the contrast of the final foreground value for each super pixel block and effectively filter out the noise.

S16, for each pixel in each video frame $I_u$, taking the final foreground value for the super pixel block in which the pixel is located as the foreground value for the pixel in the current scale;

Further, after S16, it may also include: updating the scale and returning to perform the step of dividing each video frame $I_u$ into a plurality of super pixel blocks $\{O_{u1}, O_{u2}, \ldots, O_{ui}, \ldots, O_{uN_u}\}$ according to a currently set scale to obtain a foreground value for each pixel in each video frame $I_u$ in the current scale; taking the average value for the foreground value for each pixel in each video frame $I_u$ in all scales as the foreground value for the pixel, which allows the foreground value for each pixel to be finally obtained to be more accurate.

S17, optimizing the foreground value for each pixel in each video frame $I_u$ using morphological smoothing operation; for the foreground value for each pixel in each video frame $I_u$, if the foreground value for the pixel is larger than a preset threshold, then determining that the pixel belongs to the primary video objects; otherwise, determining that the pixel belongs to the video background object sequence.

The above threshold is preferably 20% of the maximum of the foreground values for all the pixels corresponding to the current video frame $I_u$.

The method for detecting and segmenting the primary video objects with neighborhood reversibility of the present embodiment can full-automatically segment the primary video objects, and it does not need to set an assumption, such as the motion pattern or the overall change rule of the appearance of the foreground object sequence, for any videos without semantic labels, and the solution is more accurate and effective especially suitable for large-scale video data sets including complicated and challenging scenarios.

Figure 3:
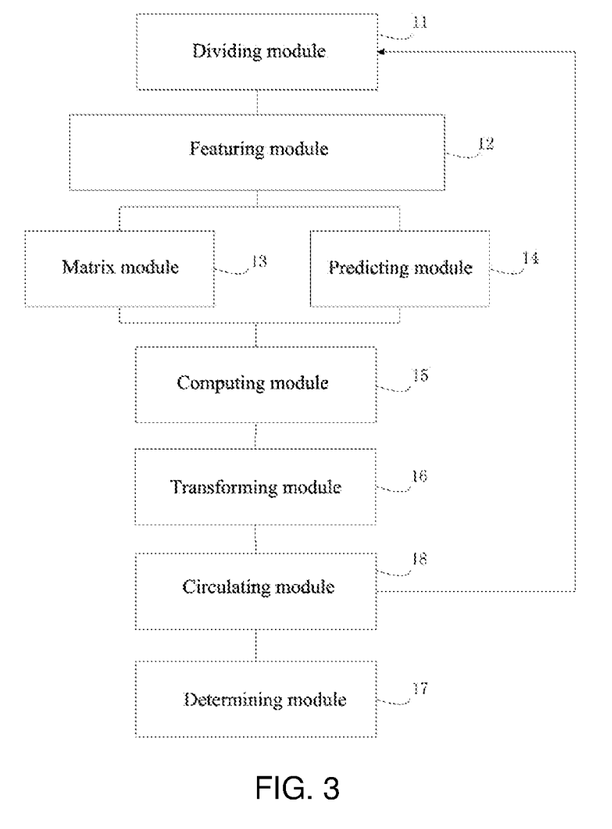
FIG. 3 is a schematic structural view of a system for detecting and segmenting primary video objects with neighborhood reversibility according to an embodiment of the present disclosure.

FIG. 3 is a schematic structural view of a system for detecting and segmenting primary video objects with neighborhood reversibility according to an embodiment of the present disclosure. As shown in FIG. 3, the system mostly includes:

A dividing module 11, configured to divide the pending video to be processed into a plurality of video frames $\{I_1, I_2, \ldots, I_{u-1}, I_u\}$ and divide each video frame $I_u$ into a plurality of super pixel blocks $\{O_{u1}, O_{u2}, \ldots, O_{ui}, \ldots, O_{uN_u}\}$ according to a currently set scale, where u is a number of the plurality of video frames, and $N_u$ is a number of super pixel blocks in the video frame $I_u$;

A featuring module 12, configured to obtain a set of visual attention attribute features for each super pixel block, where each visual attention attribute feature in the set of visual attention attribute features is an average value for the visual attention attribute feature of all the pixels in the super pixel block;

A matrix module 13, configured to, for each video frame $I_u$, with each video frame $I_v$ of T frames both prior to and after the video frame $I_u$ and the $I_u$ itself taken as the currently pending video frames, perform step 1 step 3 to obtain the 2 T neighborhood reversible matrices corresponding to the video frame $I_u$; where $I_v = \{O_{v1}, O_{v2}, \ldots, O_{vj}, \ldots, O_{vN_v}\}$, $I_v \in T_u$, $T_u = \{I_{u-T}, \ldots, I_{u-1}, I_{u+1}, \ldots, I_{u+T}\}$, T is a positive integer and $N_v$ is a number of super pixel blocks in the video frame $I_v$;

Step 1: constructing a corresponding neighborhood reversible matrix $F_{uv}$ according to super pixel blocks corresponding to currently pending video frames:

$$\begin{bmatrix} f_{u1,v1} & \cdots & \cdots & f_{u1,vj} & \cdots & \cdots & f_{u1,vN_v} \\ \cdots & \cdots & \cdots & \cdots & \cdots & \cdots & \cdots \\ \cdots & \cdots & \cdots & \cdots & \cdots & \cdots & \cdots \\ f_{ui,v1} & \cdots & \cdots & f_{ui,vj} & \cdots & \cdots & f_{ui,vN_v} \\ \cdots & \cdots & \cdots & \cdots & \cdots & \cdots & \cdots \\ \cdots & \cdots & \cdots & \cdots & \cdots & \cdots & \cdots \\ f_{uN_u,v1} & \cdots & \cdots & f_{uN_u,vj} & \cdots & \cdots & f_{uN_u,vN_v} \end{bmatrix}$$

Step 2: for each super pixel block corresponding to each video frame in the currently pending video frame, sorting all the super pixel blocks in another video frame by the similarities to the set of visual attention attribute features of the super pixel block; if a super pixel block $O_{ui}$ in the video frame $I_u$ and the super pixel block $O_{vj}$ in the video frame $I_v$ are the super pixel blocks that are most similar to the first K super pixel blocks of each other, then determining that the super pixel blocks $O_{ui}$ and $O_{vj}$ are mutually reversible K neighborhood to each other, where K is a positive integer;

Step 3: for each element $f_{ui, vj}$ in the matrix $F_{uv}$, if $K \leq K_0$, then assigning $f_{ui,vj} = \exp(-2K/K_0)$ to each element $f_{ui, vj}$, otherwise assigning 0 to them, where $K_0$ is a preset positive integer;

A predicting module 14, configured to construct a deep neural network and predict an initial foreground value for each super pixel block in each video frame $I_u$ in spatial domain based on the foreground regressor trained and obtained by the deep neural network using a large-scale data set in the field of the image salience;

A computing module 15, configured to, for each video frame $I_u$, repeatedly perform step A to step B for N times according to the 2 T neighborhood reversible matrices corresponding to the video frame $I_u$ to obtain a final foreground value for each super pixel block in the video frame $I_u$ in the time-space domain, where the final foreground value is the current foreground value for each super pixel block after the last execution of step B, and N is a preset positive integer;

Step A: transmitting the current foreground value for each super pixel block in the video frame $I_u$ sequentially to the video frame $I_v$ of T frames both prior to and after the video frame $I_u$, respectively, to obtain 2 T foreground transmitting value for each super pixel block in the video frame $I_u$, where the first formula is:

$$x_{u|v}^{t-1} = \frac{F_{uv} x_v^{t-1}}{K_0}$$

Where $x_v^{t-1}$ represents a column vector of a foreground value for each super pixel block in the video frame $I_v$ before the $t^{th}$ iteration; and $x_{u|v}^{t-1}$ represents a column vector of a foreground transmitting value transmitted to the video frame $I_v$ before the $t^{th}$ iteration of each super pixel block in the video frame $I_u$;

Step B: constructing the optimization problem and solving the optimization problem according to the foreground value and the 2 T foreground transmitting values of each super pixel block in the video frame $I_u$, and obtaining and updating the current foreground value for each super pixel block according to the optimized foreground value of each super pixel block;

A transforming module 16, configured to, for each pixel in each video frame $I_u$, take the final foreground value for the super pixel block in which the pixel is located as the foreground value for the pixel in the current scale;

A determining module 17, configured to optimize the foreground value for each pixel in each video frame $I_u$ using morphological smoothing operation; for the foreground value for each pixel in each video frame $I_u$, if the foreground value for the pixel is larger than a preset threshold, then determining that the pixel belongs to the primary video objects; otherwise, determining that the pixel belongs to the video background object sequence.

As an alternative embodiment, on the basis of any of the foregoing embodiments, the system for detecting and segmenting primary video objects with neighborhood reversibility may further include:

A circulating module 18, configured to update the scale after the transforming module 16, for each pixel in each video frame $I_u$, take the final foreground value for the super pixel block in which the pixel is located as the foreground value for the pixel in the current scale, and instruct the dividing module 11 to reperform the step of dividing each video frame $I_u$ into a plurality of super pixel blocks $\{O_{u1}, O_{u2}, \ldots, O_{ui}, \ldots, O_{uN_u}\}$ according to a currently set scale to obtain a foreground value for each pixel in each video frame $I_u$ in the current scale;

The circulating module 18 is further configured to take an average value for the foreground value for each pixel in each video frame $I_u$ in all scales is taken as the foreground value for the pixel.

Further, the matrix module 13 is specifically configured to, for each super pixel block corresponding to each video frame in the currently pending video frame, calculate a Manhattan distance between the sets of visual attention attribute features of all the super pixel blocks in another video frame and said super pixel blocks; according to the Manhattan distance, sort all the super pixels blocks in another video frame by similarities and the smaller the Manhattan distance is, the higher the similarity will be.

Further, the predicting module 14 may be specifically configured to construct a deep neural network. The deep neural network consists of 7 layers of full connection, where each layer of full connection of the first 6 layers of full connection includes 512 nodes while the 7th layer of full connection comprises 1 node, and full connection of each layer of the first 6 layers is immediately followed by the Batch normalization and Relu activation function, while the 7th layer of full connection uses the sigmod function as a loss function;

For example, 20615 training images are collected from the existing data sets of image salience. Firstly, each training image is divided into several super pixel blocks according to 15 scales, thus 16 million training samples of super pixel blocks are obtained, and a set of 41-dimensional visual attention attribute feature (including 9-dimensional color features, 9-dimensional salient features, 2-dimensional location features and 21-dimensional semantic features) is extracted for each super pixel block. For any training samples of the super pixel blocks, the average value for all the pixels' benchmark foreground values included in the training sample of super pixel block is calculated and the average value is normalized to [0,1] to obtain the benchmark foreground values of the training sample of the super pixel;

The deep neural network is used to supervise the offline spatial domain foreground regressor according to the set of visual attention attribute feature and the benchmark foreground value for training sample of each super pixel block. In the training process, the input is the set of visual attention attribute features of the training sample of super pixel block while the output is the benchmark foreground value for the training sample of super pixel block, where the output value is within the range of [0,1];

Given the deep neural network of the spatial foreground regressor that has been trained, the initial foreground value for the super pixel block in the spatial domain can be output by inputting the set of visual attention attribute feature of each super pixel block in each video frame.

Further, the computing module 15 may specifically include:

A constructing unit, configured to construct a quadratic optimization formula:

$$x_u^t = \mathrm{argmin}_x \|x - x_u^{t-1}\|_2^2 + \lambda_c \sum_{v \in T_u} \|x - x_{u|v}^{t-1}\|_2^2, \text{ s.t. } x \pm 0$$

Where $\lambda c$ is a positive real number, preferably with a value of 0.5, $x_u^{t-1}$ represents a column vector of the foreground value for each super pixel block prior to the $t^{th}$ iteration in the video frame $I_u$, $x_u^t$ represents the column vector of the foreground value for each super pixel block after the $t^{th}$ iteration in the video frame $I_u$;

A resolving unit, configured to substitute the Euclidean distance formula into the above quadratic optimization formula:

$$d_{12} = \sqrt{\sum_{k=1}^{n}(x_{1k} - x_{2k})^2}$$

The resolving unit is further configured to resolve and obtain the foreground value for each super pixel block in video frame $I_u$:

$$x_u^t = \frac{x_u^{t-1} + \lambda_c \sum_{v \in T_u} x_{u|v}^{t-1}}{1 + \lambda_c}$$

A normalizing unit, configured to normalize the foreground value for each super pixel block in the obtained video frame $I_u$ to [0,1] to obtain the optimized foreground value for each super pixel block.

Further, the computing module 15 is further configured to process the final foreground value for each super pixel block in the time-space domain of the video frame $I_u$ using Gaussian high-pass filtering.

It will be apparent to those skilled in the art that, for the convenience and simplicity of description, the specific working process of the described systems described above may refer to the corresponding process in the foregoing method embodiment and will not be described here further.

Finally, it should be noted that the above embodiments are merely illustrative of the technical solutions of the present disclosure and are not intended to be limiting thereof; while the present disclosure has been described in detail with reference to the foregoing embodiments, it should be understood by those of ordinary skill in the art that: it is still possible to modify the technical solutions described in the foregoing embodiments or to equivalently substitute some or all of the technical features therein; these modifications or substitutions do not cause the essence of the corresponding technical solution to depart from the scope of technical solutions of the embodiments in the present disclosure.

What is claimed is:

1. A method for detecting and segmenting primary video objects with neighborhood reversibility, comprising:

dividing a pending video to be processed into a plurality of video frames $\{I_1, I_2, \ldots, I_{u-1}, I_u\}$ and dividing each video frame $I_u$ into a plurality of super pixel blocks $\{O_{u1}, O_{u2}, \ldots, O_{ui}, \ldots, O_{uN_u}\}$ according to a currently set scale, wherein u is a number of the plurality of video frames, and $N_u$ is a number of the super pixel blocks in the video frame $I_u$;

obtaining a set of visual attention attribute features for each super pixel block, wherein each visual attention attribute feature in the set of visual attention attribute features is an average value for the visual attention attribute feature of all pixels in the super pixel block;

for each video frame $I_u$, with each video frame $I_v$ of T frames both prior to and after the video frame $I_u$ and the $I_u$ itself taken as currently pending video frames, performing step 1 to step 3 to obtain 2 T neighborhood reversible matrices corresponding to the video frame $I_u$; wherein $I_v = \{O_{v1}, O_{v2}, \ldots, O_{vj}, \ldots, O_{vN_v}\}$, $I_v \in T_u$, $T_u = \{I_{u-T}, \ldots, I_{u-1}, I_{u+1}, \ldots, I_{u+T}\}$, T is a positive integer and $N_v$ is a number of super pixel blocks in the video frame $I_v$;

step 1: constructing a corresponding neighborhood reversible matrix $F_{uv}$ according to the super pixel block corresponding to the currently pending video frames:

$$\begin{bmatrix} f_{u1,v1} & \cdots & \cdots & f_{u1,vj} & \cdots & \cdots & f_{u1,vN_v} \\ \cdots & \cdots & \cdots & \cdots & \cdots & \cdots & \cdots \\ \cdots & \cdots & \cdots & \cdots & \cdots & \cdots & \cdots \\ f_{ui,v1} & \cdots & \cdots & f_{ui,vj} & \cdots & \cdots & f_{ui,vN_v} \\ \cdots & \cdots & \cdots & \cdots & \cdots & \cdots & \cdots \\ \cdots & \cdots & \cdots & \cdots & \cdots & \cdots & \cdots \\ f_{uN_u,v1} & \cdots & \cdots & f_{uN_u,vj} & \cdots & \cdots & f_{uN_u,vN_v} \end{bmatrix}$$

step 2: for each super pixel block corresponding to each video frame in the currently pending video frame, sorting all the super pixel blocks in another video frame by the similarities to the set of visual attention attribute features of the super pixel blocks; if a super pixel block $O_{ui}$ in the video frame $I_u$ and a super pixel block $O_{vj}$ in the video frame $I_v$ are the super pixel blocks that are most similar to first K super pixel blocks of each other, then determining that the super pixel blocks $O_{ui}$ and $O_{vj}$ are mutually reversible K neighborhoods to each other, wherein K is a positive integer;

step 3: for each element $f_{ui, vj}$ in the matrix $F_{uv}$, if $K \leq K_0$, then assigning $f_{ui,vj} = \exp(-2K/K_0)$ to the element $f_{ui, vj}$, otherwise assigning 0, wherein $K_0$ is a preset positive integer;

constructing a deep neural network and predicting an initial foreground value for each super pixel block in each video frame $I_u$ in spatial domain based on a foreground regressor trained and obtained by the deep neural network using a large-scale data set in the field of image salience;

for each video frame $I_u$, repeatedly performing step A to step B for N times according to 2 T neighborhood reversible matrices corresponding to the video frame $I_u$ to obtain a final foreground value for each super pixel block in the video frame $I_u$ in time-space domain, wherein the final foreground value is a current foreground value for each super pixel block after the last execution of step B, and N is a preset positive integer;

step A: transmitting the current foreground value for each super pixel block in the video frame $I_u$ sequentially to the video frame $I_v$ of T frames both prior to and after the video frame $I_u$, respectively, to obtain 2 T foreground transmitting values for each super pixel block in the video frame $I_u$, wherein the first formula is:

$$x_{u|v}^{t-1} = \frac{F_{uv} x_v^{t-1}}{K_0};$$

wherein $x_v^{t-1}$ represents a column vector of a foreground value for each super pixel block in the video frame $I_v$ before the $t^{th}$ iteration; and $x_{u|v}^{t-1}$ represents a column vector of a foreground transmitting value transmitted to the video frame $I_v$ before the $t^{th}$ iteration of each super pixel block in the video frame $I_u$;

step B: constructing an optimization problem and solving the optimization problem according to foreground values and the 2 T foreground transmitting values of each super pixel block in the video frame $I_u$, and obtaining and updating the current foreground value for each super pixel block according to the optimized foreground value of each super pixel block;

for each pixel in each video frame $I_u$, taking the final foreground value for the super pixel block in which the pixel is located as the foreground value for the pixel in a current scale;

optimizing the foreground value for each pixel in each video frame $I_u$ using morphological smoothing operation; for the foreground value for each pixel in each video frame $I_u$, if the foreground value for the pixel is larger than a preset threshold, then determining that the pixel belongs to the primary video objects; otherwise, determining that the pixel belongs to a video background object sequence.

2. The method according to claim 1, wherein the set of visual attention attribute features comprises color features, salient features, location features, and semantic features.

3. The method according to claim 1, wherein the place deep neural network consists of 7 layers of full connection, wherein each layer of full connection of a first 6 layers of full connection comprises 512 nodes and the $7^{th}$ layer of full connection comprises 1 node, and each layer of full connection of the first 6 layers is immediately followed by Batch normalization and a Relu activation function, and the $7^{th}$ layer of full connection uses a sigmod function as a loss function; and an input of the deep neural network is the set of visual attention attribute features of the super pixel block while an output is the initial foreground value for the super pixel block and the output value is within a range of [0,1].

4. The method according to claim 1, wherein the for each super pixel block corresponding to each video frame in the currently pending video frame to be processed, sorting all the super pixel blocks in another video frame by the similarities to the set of visual attention attribute features of the super pixel blocks comprises:

for each super pixel block corresponding to each video frame in the currently pending video frame, calculating a Manhattan distance between the sets of visual attention attribute features of all the super pixel blocks in another video frame and said super pixel block;

according to the Manhattan distance, sorting all the super pixels blocks in another video frame by similarities, wherein the smaller the Manhattan distance is, the higher the similarity will be.

5. The method according to claim 1, wherein the constructing an optimization problem and solving the optimization problem according to foreground values and the 2 T foreground transmitting values of each super pixel block in the video frame $I_u$, and obtaining and updating the current foreground value for each super pixel block in step B comprises:

constructing a quadratic optimization formula:

$$x_u^t = \arg\min_x \|x - x_u^{t-1}\|_2^2 + \lambda_c \sum_{v \in T_u} \|x - x_{u|v}^{t-1}\|_2^2, \text{ s.t. } x \pm 0$$

wherein $\lambda c$ is a positive real number, $x_u^{t-1}$ represents a column vector of the foreground value for each super pixel block prior to the $t^{th}$ iteration in the video frame $I_u$, $x_u^t$ represents a column vector of the foreground value for each super pixel block after the $t^{th}$ iteration in the video frame $I_u$;

substituting a Euclidean distance formula into the quadratic optimization formula, and resolving and obtaining the foreground value for each super pixel block in the video frame $I_u$;

$$x_u^t = \frac{x_u^{t-1} + \lambda_c \sum_{v \in T_u} x_{u|v}^{t-1}}{1 + \lambda_c}$$

normalizing the foreground value for each super pixel block in the obtained video frame $I_u$ to [0,1] to obtain the optimized foreground value for the each super pixel block.

6. The method according to claim 1, wherein after the for each video frame $I_u$, repeatedly performing step A to step B for N times according to 2 T neighborhood reversible matrices corresponding to the video frame $I_u$ to obtain a final foreground value for each super pixel block in the video frame $I_u$ in the time-space domain, further comprises:
processing the final foreground value for each super pixel block in the time-space domain of the video frame $I_u$ using Gaussian high-pass filtering.

7. The method according to claim 1, wherein the threshold is 20% of the maximum of the foreground values for all the pixels corresponding to the current video frame $I_u$.

8. The method according to claim 1, wherein after the for each pixel in each video frame $I_u$, taking the final foreground value for the super pixel block in which the pixel is located as the foreground value for the pixel, further comprises:
updating the scale and returning to perform the step of dividing each video frame $I_u$ into a plurality of super pixel blocks $\{O_{u1}, O_{u2}, \ldots, O_{ui}, \ldots, O_{uN_u}\}$ according to the currently set scale to obtain the foreground value for each pixel in each video frame $I_u$ in the current scale;
taking an average value for the foreground value for each pixel in each video frame $I_u$ in all scales as the foreground value for the pixel.

9. A system for detecting and segmenting primary video objects with neighborhood reversibility, comprising: a computer readable medium and a processor, wherein a computer program is stored on the computer readable medium, and when the computer program is executed by the processor, the processor is configured to:
divide a pending video to be processed into a plurality of video frames $\{I_1, I_2, \ldots, I_{u-1}, I_u\}$ and dividing each video frame $I_u$ into a plurality of super pixel blocks $\{O_{u1}, O_{u2}, \ldots, O_{ui}, \ldots, O_{uN_u}\}$ according to a currently set scale, wherein u is a number of the plurality of video frames, and $N_u$ is a number of super pixel blocks in the video frame $I_u$;

obtain a set of visual attention attribute features for each super pixel block, wherein each visual attention attribute feature in the set of visual attention attribute features is an average value for the visual attention attribute feature of all pixels in the super pixel block;
for each video frame $I_u$, with each video frame $I_v$ of T frames both prior to and after the video frame $I_u$ and the $I_u$ itself taken as currently pending video frames, perform step 1 to step 3 to obtain 2 T neighborhood reversible matrices corresponding to the video frame $I_u$; wherein $I_v = \{O_{v1}, O_{v2}, \ldots, O_{vj}, \ldots, O_{vN_v}\}$, $I_v \in T_u$, $T_u = \{I_{u-T}, \ldots, I_{u-1}, I_{u+1}, \ldots, I_{u+T}\}$, T is a positive integer and $N_v$ is a number of super pixel blocks in the video frame $I_v$;
step 1: constructing a corresponding neighborhood reversible matrix $F_{uv}$ according to the super pixel blocks corresponding to the currently pending video frames;

$$\begin{bmatrix} f_{u1,v1} & \cdots & \cdots & f_{u1,vj} & \cdots & \cdots & f_{u1,vN_v} \\ \cdots & \cdots & \cdots & \cdots & \cdots & \cdots & \cdots \\ \cdots & \cdots & \cdots & \cdots & \cdots & \cdots & \cdots \\ f_{ui,v1} & \cdots & \cdots & f_{ui,vj} & \cdots & \cdots & f_{ui,vN_v} \\ \cdots & \cdots & \cdots & \cdots & \cdots & \cdots & \cdots \\ \cdots & \cdots & \cdots & \cdots & \cdots & \cdots & \cdots \\ f_{uN_u,v1} & \cdots & \cdots & f_{uN_u,vj} & \cdots & \cdots & f_{uN_u,vN_v} \end{bmatrix}$$

step 2: for each super pixel block corresponding to each video frame in the currently pending video frame, sorting all the super pixel blocks in another video frame by the similarities to the set of visual attention attribute features of the super pixel blocks; if a super pixel block $O_{ui}$ in the video frame $I_u$ and a super pixel block $O_{vj}$ in the video frame $I_v$ are the super pixel blocks that are most similar to first K super pixel blocks of each other, then determining that the super pixel blocks $O_{ui}$ and $O_{vj}$ are mutually reversible K neighborhoods to each other, wherein K is a positive integer;
step 3: for each element $f_{ui, vj}$ in the matrix $F_{uv}$, if $K \leq K_0$ then assigning $f_{ui,vj} = \exp(-2K/K_0)$ to the element $f_{ui, vj}$, otherwise assigning 0, wherein $K_0$ is a preset positive integer;
the processor is further configured to, construct a deep neural network and predict an initial foreground value for each super pixel block in each video frame $I_u$ in spatial domain based on a foreground regressor trained and obtained by the deep neural network using a large-scale data set in the field of image salience;
for each video frame $I_u$, repeatedly perform step A to step B for N times according to the 2 T neighborhood reversible matrices corresponding to the video frame $I_u$ to obtain a final foreground value for each super pixel block in the video frame $I_u$ in the time-space domain, wherein the final foreground value is a current foreground value for each super pixel block after the last execution of step B, and N is a preset positive integer;
step A: transmitting the current foreground value for each super pixel block in the video frame $I_u$ sequentially to the video frame $I_v$ of T frames both prior to and after the video frame $I_u$, respectively, to obtain 2 T foreground transmitting values for each super pixel block in the video frame $I_u$, wherein the first formula is:

$$x_{u|v}^{t-1} = \frac{F_{uv} \cdot x_v^{t-1}}{K_0}$$

wherein $x_v^{t-1}$ represents a column vector of a foreground value for each super pixel block in the video frame $I_v$ before the $t^{th}$ iteration; and $x_{u|v}^{t-1}$ represents a column vector of a foreground transmitting value transmitted to the video frame $I_v$ before the $t^{th}$ iteration of each super pixel block in the video frame $I_u$;

step B: constructing an optimization problem and solving the optimization problem according to the foreground values and the 2 T foreground transmitting values of each super pixel block in the video frame $I_u$, and obtaining and updating the current foreground value for each super pixel block according to the optimized foreground value of each super pixel block;

the processor is further configured to, for each pixel in each video frame $I_u$, take the final foreground value for the super pixel block in which the pixel is located as the foreground value for the pixel in a current scale;

optimize the foreground value for each pixel in each video frame $I_u$ using morphological smoothing operation; and for the foreground value for each pixel in each video frame $I_u$, if the foreground value for the pixel is larger than a preset threshold, then determining that the pixel belongs to the primary video objects; otherwise, determining that the pixel belongs to a video background object sequence.

10. The system according to claim 9, wherein the processor is further configured to:

update the scale after the transforming module, for each pixel in each video frame $I_u$, take the final foreground value for the super pixel block in which the pixel is located as the foreground value for the pixel in the current scale, and instruct the dividing module to reperform the step of dividing each video frame $I_u$ into a plurality of super pixel blocks $\{O_{u1}, O_{u2}, \ldots, O_{ui}, \ldots, O_{uN_u}\}$ according to a currently set scale to obtain the foreground value for each pixel in each video frame $I_u$ in the current scale;

take an average value for the foreground value for each pixel in each video frame $I_u$ in all scales as the foreground value for the pixel.

* * * * *